United States Patent [19]
Klein et al.

[11] Patent Number: 5,176,403
[45] Date of Patent: Jan. 5, 1993

[54] SAFETY BELT ARRANGEMENT FOR THE REAR SEAT UNIT OF A MOTOR VEHICLE

[75] Inventors: Dieter Klein, Weissach-Flacht; Willi Wurl, Niefern-Oeschelbronn, both of Fed. Rep. of Germany

[73] Assignee: Dr. Ing. h.c.F. Porsche AG, Fed. Rep. of Germany

[21] Appl. No.: 648,984

[22] Filed: Jan. 31, 1991

[30] Foreign Application Priority Data

Feb. 9, 1990 [DE] Fed. Rep. of Germany ....... 4003941

[51] Int. Cl.⁵ .............................................. B60R 22/34
[52] U.S. Cl. ................................. 280/808; 296/186
[58] Field of Search ....................... 280/801, 808, 807; 297/468, 483; 296/195, 186, 198

[56] References Cited

U.S. PATENT DOCUMENTS

| 4,592,571 | 6/1986 | Baumann et al. | 280/808 |
| 4,971,357 | 11/1990 | Nakasaki | 280/801 |
| 4,988,121 | 1/1991 | Yoshii | 280/808 |

FOREIGN PATENT DOCUMENTS

| 7834906 | 11/1978 | Fed. Rep. of Germany . |
| 3924969 | 2/1990 | Fed. Rep. of Germany . |
| 61-98654 | 5/1986 | Japan . |
| 61-191453 | 8/1986 | Japan . |

*Primary Examiner*—Karin L. Tyson
*Attorney, Agent, or Firm*—Evenson, Wands, Edwards, Lenahan & McKeown

[57] ABSTRACT

A safety belt arrangement for the rear seat unit of a motor vehicle comprises a diagonal upper-torso belt, the upper end of which interacts with a belt retractor which is fastened to a stationary component arranged behind the rear seat unit. In order to provide, for a motor vehicle having a folding top and a rear-side top compartment, a safety belt arrangement for the rear seat unit in which the belt retractor mounted on the upper end of the diagonal upper-torso belt is arranged to ensure a proper operation and can absorb high forces, it is provided that the diagonal upper-torso belt is guided by means of a guiding element over the upper edge of an upright transversely extending front boundary wall of the top compartment and in that the belt retractor is arranged below the guiding element in a recess of the top compartment in a covered manner.

15 Claims, 4 Drawing Sheets

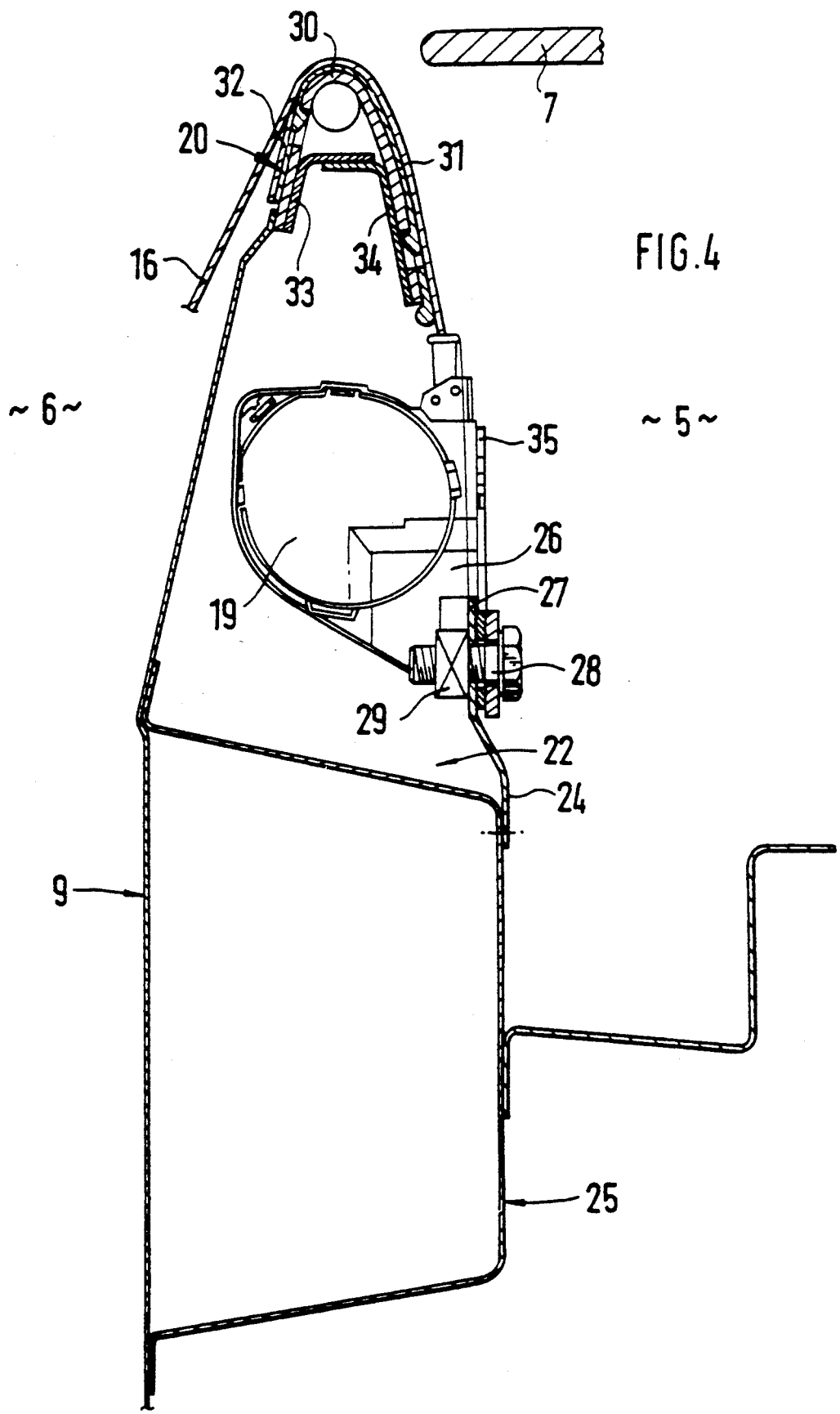

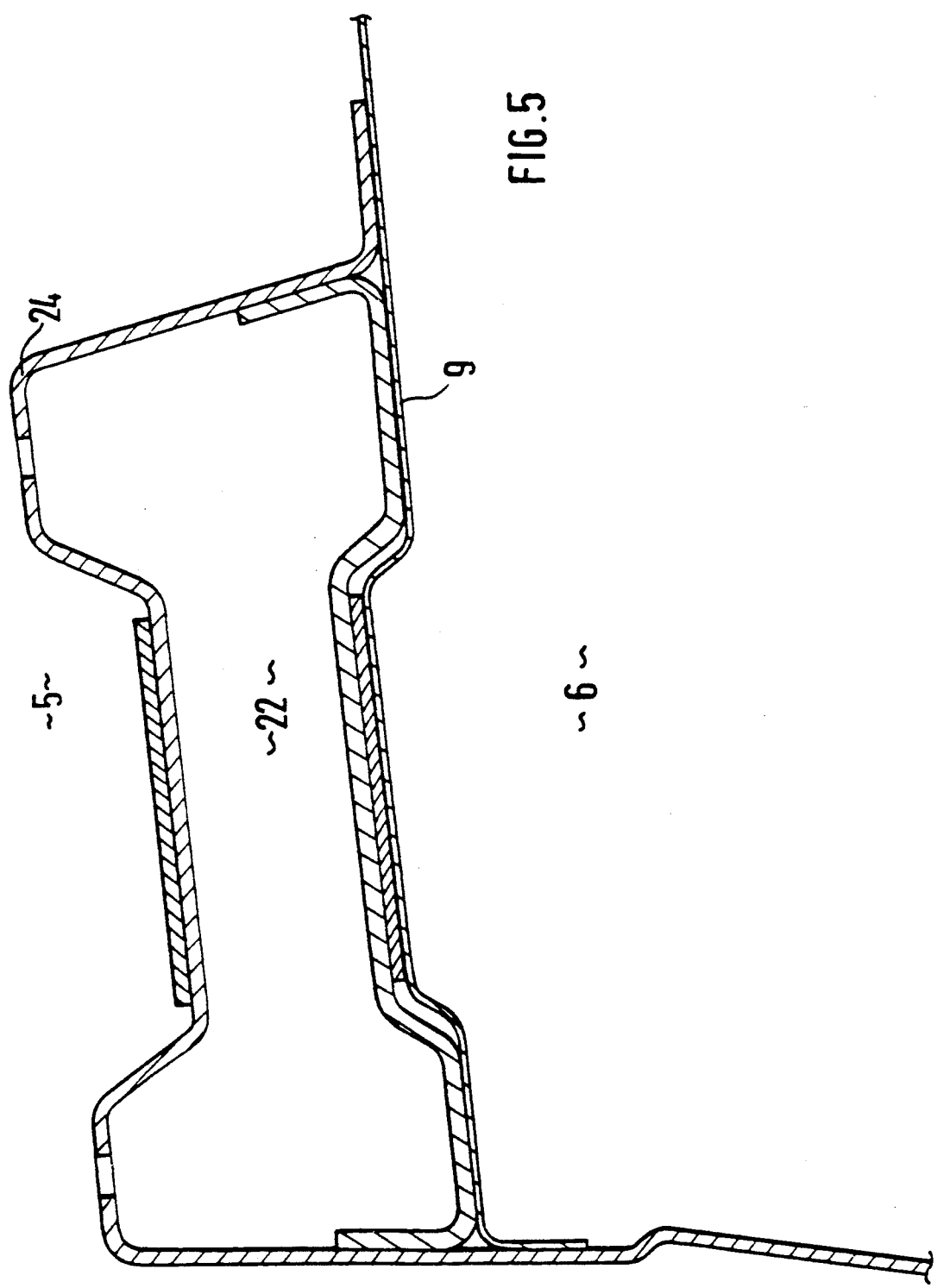

SAFETY BELT ARRANGEMENT FOR THE REAR SEAT UNIT OF A MOTOR VEHICLE

BACKGROUND AND SUMMARY OF THE INVENTION

The invention relates to a safety belt arrangement the rear seat unit of a motor vehicle, particularly of a convertible, comprising an upper end of a diagonal upper-torso belt interacting with a belt retractor which is fastened to a stationary component arranged behind a rear seat unit.

In the case of a known safety belt arrangement of the initially mentioned type (German Patent Document DE-GM 78 34 906), the belt retractor connected with the upper end of the diagonal upper-torso belt is fastened to the upper side of an approximately horizontally aligned rear window shelf which extends behind the rear seat unit approximately at the level of a lower edge of the rear window.

So that the occurring forces can be absorbed well on the body side, it is necessary in the case of this safety belt arrangement that the rear window shelf be constructed to be correspondingly rigid. In addition, this arrangement is not suitable for vehicles having a folding top which, in the folded-together state, is housed in a top compartment arranged behind the rear seat unit.

It is an object of the invention to provide a safety belt arrangement for the rear seat unit for motor vehicles having a folding top and a rear side top compartment, in which the belt retractor mounted on the upper end of the diagonal upper-torso belt is arranged properly with respect to its function and can absorb high forces.

According to the invention, this object is achieved by providing an arrangement wherein the diagonal upper-torso belt is guided over an upper edge of an upright front boundary wall of a top compartment by means of a guiding element and wherein the belt retractor is arranged below the guiding element in a recess of the top compartment in a covered manner.

Principal advantages achieved by the invention are that by means of the covered arrangement of the belt retractor in a recess of the front boundary wall of the top compartment and by the guiding element for the diagonal upper-torso belt, which is placed in front, a safety belt arrangement is achieved that functions well. Because of the connecting of the recess to a transverse member of the top compartment, the occurring forces are absorbed well and are introduced well into the vehicle body.

The recess which receives the belt retractor is easy to manufacture and has a high rigidity.

Other objects, advantages and novel features of the present invention will become apparent from the following detailed description of the invention when considered in conjunction with the accompanying drawings.

BRIEF DESCRIPTION OF THE DRAWINGS

FIG. 4 is an enlarged sectional view taken along Line IV—IV of FIG. 3; and

FIG. 5 is an enlarged sectional view taken along Line V—V of FIG. 3.

DETAILED DESCRIPTION OF THE DRAWINGS

Figure 1:
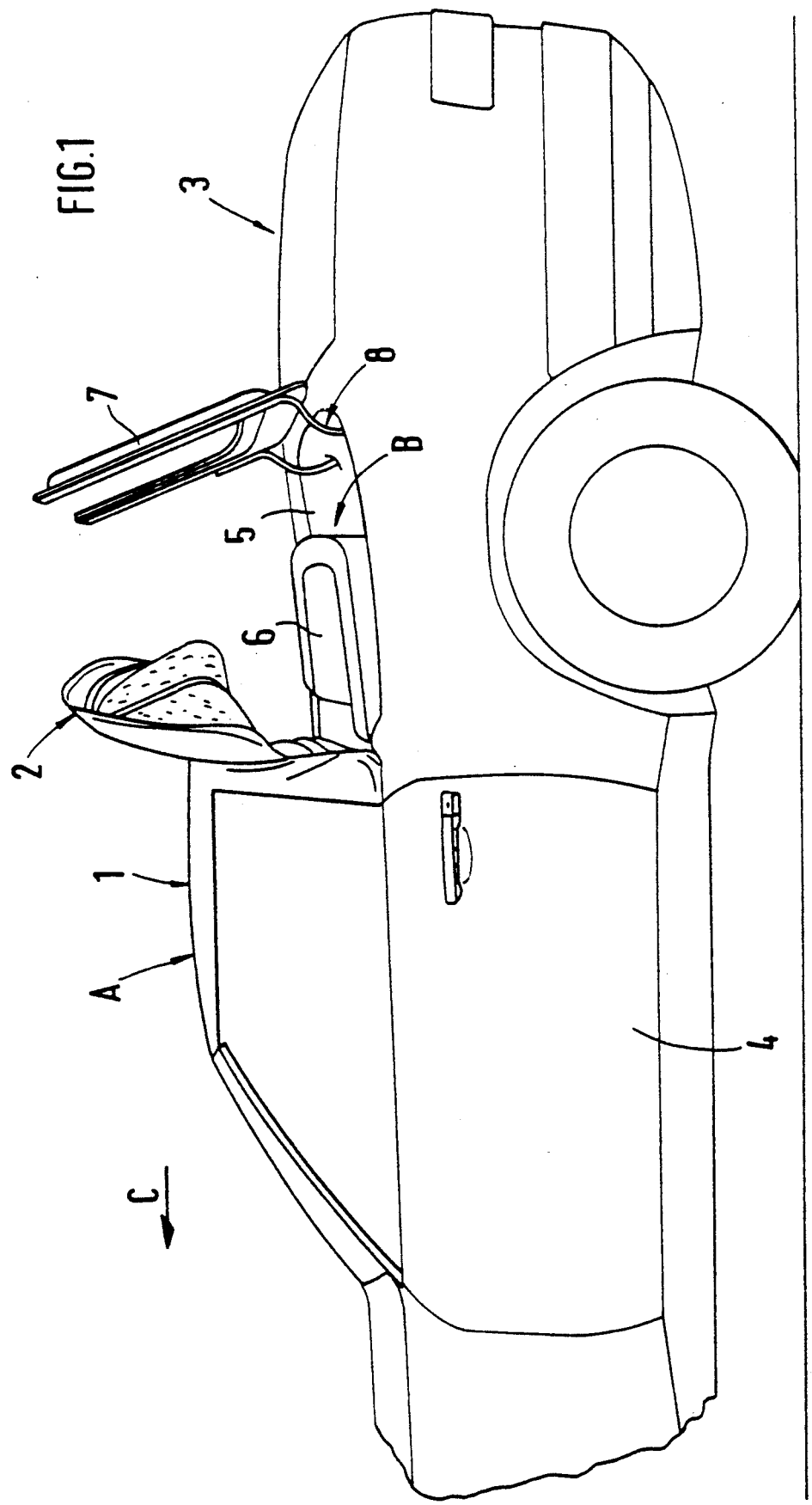
FIG. 1 is a partial lateral view of a passenger car having a folding top of the type with which the present invention is to be used.
Figure 2:
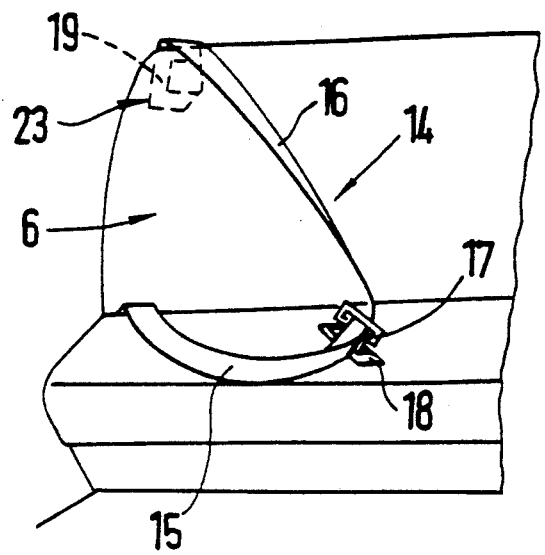
FIG. 2 is a schematic partial view, from the front, of a rear seat unit of the passenger car of FIG. 1, having a safety belt arrangement constructed according to a preferred embodiment of the invention.

A motor vehicle 1 having a folding top 2, in the shown area, comprises a body 3 with side doors 4, a top compartment 5, and a rear seat unit 6 (FIG. 1).

The folding top 2 can be moved from a closed position A, into a folded-together position B and vice versa, in which case, in the folded-together position, the folding top 2 is arranged inside the top compartment 5 in a covered manner. The top compartment 5 can be closed off by a swivelling flap 7 which is hinged to the vehicle body 3 by way of hinges 8.

Figure 3:
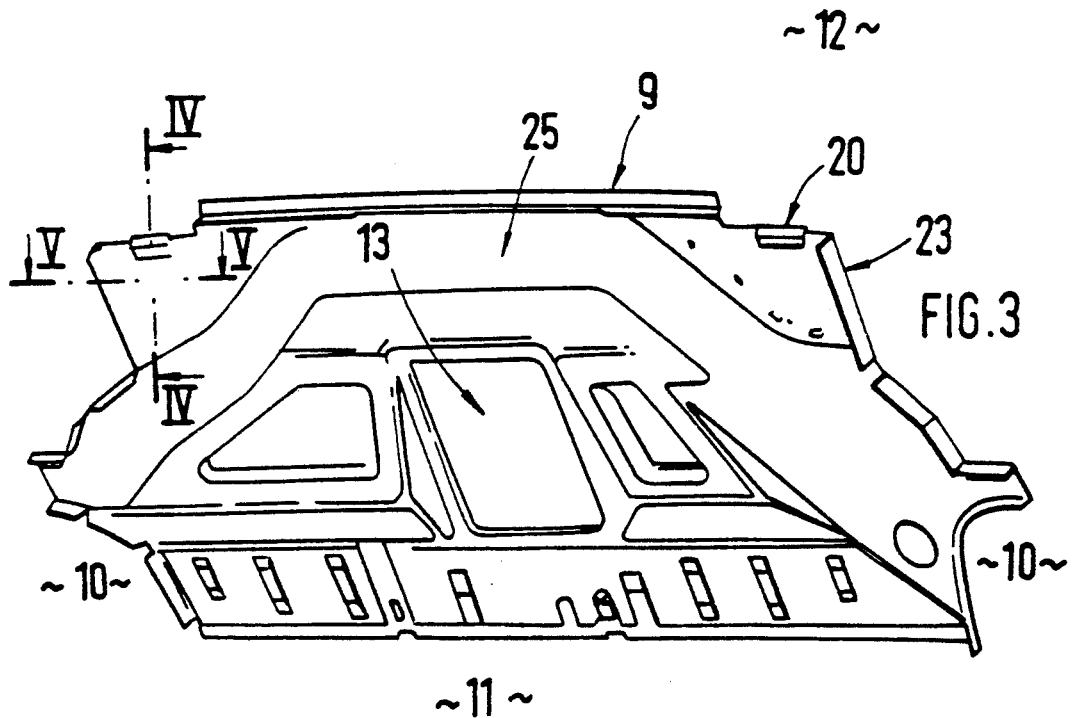
FIG. 3 is a schematic perspective view, from the front, of a front boundary wall of the top compartment of the vehicle of FIGS. 1 and 2.

Viewed in the driving direction C, the top compartment 5 is arranged directly behind the rear side unit 6 and has a front boundary wall 9 which, on the bottom, is connected to the frame floor and in the lateral area, is connected to the two wheel houses 10 and represents a partition between a passenger compartment 11 and a trunk area 12 (FIG. 3). In a center area of the boundary wall 9, a large-surface opening 13 is provided whereby a load-through possibility is created between the trunk 12 and the passenger compartment 11 (FIG. 3).

In order to protect an occupant sitting on the rear seat unit 6, a safety belt arrangement is provided which preferably is constructed as a three-point safety belt 14. The three-point safety belt comprises a lap belt 15 and a diagonal upper-torso belt 16 which, in a common connecting area, have a buckle latch 17 which can be connected with a vehicle-body-side belt buckle 18. The belt buckle 18 is arranged adjacent to a longitudinal center plane of the vehicle. An upper end of the diagonal upper-torso belt 16 is connected with a belt retractor 19. According to FIGS. 3 and 4, the diagonal upper-torso belt 16 is guided by means of a guiding element 20 over the upper edge of the upright boundary wall 9 of the top compartment 5 and then extends vertically downward to the belt retractor 19 which is arranged in a recess 22 of the top compartment 5 in a covered manner.

The recess 22 is arranged in an upper, laterally exterior area 23 of the front boundary wall 9 of the top compartment 5. According to FIG. 5, the recess 22 is formed by the front boundary wall 9 and a closing part 24 which is profiled approximately in a hat shape and which, on the side facing away from the rear seat unit 6, is fitted onto the boundary wall 7 and a box-shaped transverse member 25 disposed below it.

On the side facing the top compartment 5, the closing part 24 has an opening 26 for the inserting of the belt retractor 19. The belt retractor 19 is placed on a vertically upward-projecting flange 27 of the closing part 24 and is held in its position by means of a fastening screw 28. The fastening screw 28 is screwed into a weld nut 29 which is provided inside the recess 22 on the closing part 24. The guiding element 20 for the upper-torso strap 16 is formed by a curved reinforcement part 30 which is firmly connected with the closing part 24 and the front boundary wall 9. On the exterior side of the reinforcement part 30, a covering 31 is provided that is made of a suitable plastic material. The covering 31 is adapted to the curved dimension of the reinforcement part 30 and is locally connected with the reinforcement part 30 by means of screws, clips or the like. The covering 31 has lateral webs 32 for the guiding of the diagonal upper-torso strap 16 at least on the side facing the rear seat unit 6. In addition, in the upper area of the recess 22, specifically inside the reinforcement part 30, an additional angular strengthening 33 is provided which is connected with a horizontally bent flange 34 of the closing part 24 and the reinforcement part 30. A rearward housing wall 35 of the belt retractor 19 rests against the side of the flange 27 facing the top compartment 5.

By means of the covered arrangement of the belt retractor 19 in the recess 22, the free design of the vehicle body 3 or of the top compartment 5 is not limited, and the belt retractor is not subjected to any mechanical stress. In addition, the belt retractor 19 can be mounted and demounted easily and rapidly. By means of the support-type design of the recess 22 and the connection to the box-shaped transverse member 25, large forces can be transmitted into the vehicle body by means of the safety belt system 14. Viewed in the vertical direction, the upper edge of the guiding element 20 extends slightly below the adjacent flap 7 of the top compartment and is disposed in front of the flap 7 (FIG. 4).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In combination, a safety belt arrangement and a convertible motor vehicle having a seat unit, the convertible further having a top compartment defining a space for storing a retractable convertible top, said top compartment being arranged behind the seat unit and having a forward boundary wall, said safety belt arrangement comprising an upper end of a diagonal upper-torso belt interacting with a belt retractor which is fastened to a stationary component forming said forward boundary wall and arranged behind the seat unit, wherein the diagonal uppertorso belt is guided from one side of the boundary wall to the other over an upper edge of the upright boundary forward wall of the top compartment by means of a guiding element, said boundary wall defining a rearwardly facing recess therein and wherein the belt retractor is arranged below the guiding element in the recess of the boundary wall.

2. A safety belt arrangement according to claim 1, wherein the recess is arranged in an upper laterally exterior area of the forward boundary wall of the top compartment.

3. A safety belt arrangement according to claim 1, wherein the recess is forward by the forward boundary wall of the top compartment and a closing part which is profiled approximately in a shape having a first section and substantially perpendicularly extending side sections at respective ends of the first section and which is placed on the forward boundary wall and a transverse member disposed below it on the side facing away from the rear seat unit.

4. A safety belt arrangement according to claim 3, wherein the closing part has an opening for the inserting of the belt retractor on the side facing the top compartment.

5. A safety belt arrangement according to claim 4, wherein a flange which vertically projects upwards for the fastening of the belt retractor is provided in the lower area of the opening.

6. A safety belt arrangement according to claim 5, wherein a weld nut is mounted on the interior side of the flange into which a fastening screw is screwed for the belt retractor.

7. A safety belt arrangement according to claim 6, wherein the guiding element is formed by a curved reinforcement part which is firmly connected with the closing part and the forward boundary wall and in that a covering made of plastic is provided on the exterior side of the reinforcement part.

8. A safety belt arrangement according to claim 7, wherein the covering is fastened to the reinforcement part disposed underneath it by means of a clip connection.

9. A safety belt arrangement according to claim 8, wherein a strengthening is provided inside the recess which connects a horizontally projecting flange of the closing part with the reinforcement part.

10. A safety belt arrangement according to claim 9, wherein lateral webs for the guiding of the diagonal uppertorso belt are provided on the side or the covering facing the seat unit.

11. A safety belt arrangement according to claim 10, wherein a rearward housing wall rests against the side of the projecting flange facing the top compartment for the fastening of the belt retractor.

12. A safety belt arrangement according to claim 1, wherein the seat unit is a rear seat unit of a motor vehicle.

13. A safety belt arrangement according to claim 2, wherein the seat unit is a rear seat unit of a motor vehicle.

14. A safety belt arrangement according to claim 4, wherein the seat unit is a rear seat unit of a motor vehicle.

15. A safety belt arrangement according to claim 10, wherein the seat unit is a rear seat unit of a motor vehicle.

* * * * *